1,451,542

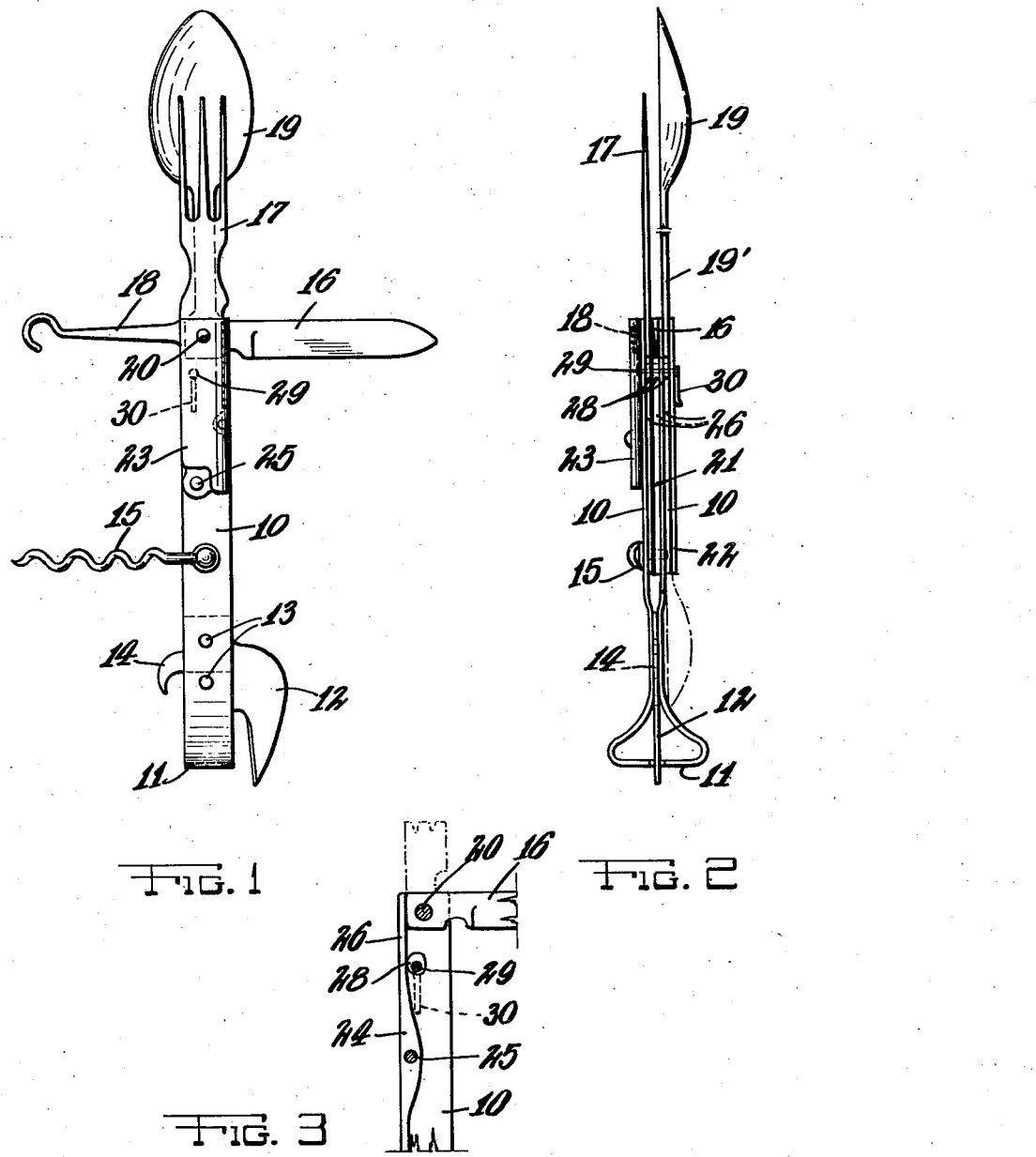
Apr. 10, 1923
A. FTYKLO
COMBINATION UTENSIL
Filed Nov. 1, 1921
1,451,542
Inventor
Andy Ftyklo
By
Attorney Patented Apr. 10, 1923.

UNITED STATES PATENT OFFICE.

ANDREW FTYKLO, OF BRAZNELL, PENNSYLVANIA.

COMBINATION UTENSIL.

Application filed November 1, 1921. Serial No. 511,987.

*To all whom it may concern:*

Be it known that I, ANDREW FTYKLO, a citizen of Poland, residing at Braznell, in the county of Fayette and State of Pennsylvania, have invented certain new and useful Improvements in Combination Utensils, of which the following is a specification.

This invention relates to a combination utensil in which a series of tools or implements are carried on a single handle.

The invention has for an object to provide a utensil of this sort having the different tools or implements conveniently mounted thereon.

A further object is to provide a means for facilitating the swinging of foldable tools or blades to their extended positions.

For further comprehension of the invention, and of the objects and advantages thereof, reference will be had to the following description and accompanying drawings, and to the appended claim in which the various novel features of the invention are more particularly set forth.

Figure 1 of the drawings is a side view of a combination utensil constructed according to the invention, showing the foldable tools in opened or partially opened positions;

Fig. 2 is an edge view thereof; and

Fig. 3 is a fragmentary longitudinal section taken just inside one of the side members of the handle.

As here embodied my improved combination utensil comprises a handle made up of a flat strip of metal 10 doubled upon itself midway between its ends to form a pair of side plates. The intermediate portion of this strip is bent transversely to the main length of the handle as at 11 to form a bearing element adapted to co-operate with a pointed blade 12 in forming a can opener, this blade being riveted as at 13 between the two reaches of the strip. From the haft element of the blade 12 a bottle-decapping claw 14 projects in opposition to the blade, while a corkscrew 15 is hinged to the handle as shown.

From the blade 12 to the opposite end of the handle the two reaches of the strip are more widely separated so as to permit of a number of tools being accommodated therebetween. To the last-mentioned end of the handle are attached a knife blade 16, a fork 17, a button hook 18, and a spoon 19, which are all pivoted on a common stud 20. The knife 16 and fork 17 are pivoted between the two reaches of the strip 10, and are separated by the usual partition 21, while the button hook 18 and spoon 19 are pivoted outside said reaches and on opposed sides of the handle. When the spoon 19 is folded against the handle the stem 19' thereof is covered by a supplementary strip 22, while the button hook 18 may be accommodated in a supplementary strip 23 on the opposite face of the handle.

Behind the knife, fork, and spoon the usual back elements such as 24 are provided which are held in place by a rivet 25 serving also to bind the whole handle structure together. These back elements have the usual spring fingers 26 which are adapted to engage the squared ends of the haft elements of the implements to hold the latter either in closed or extended positions.

To facilitate the opening of the implements folded in the handle a number of cams 28 are located in front of the spring elements 26, being fixed on a rotatable stud 29 on one end of which is a thumb piece 30 by which the stud can be turned. When the cams are moved to operative position the spring elements 26 are forced backward away from the haft elements of the implements and the latter can then be easily opened.

As will be apparent I have provided a handy combination utensil which can be used for a variety of purposes and which is particularly serviceable for campers or picnickers.

Having thus described my invention what I claim as new and desire to protect by Letters Patent of the United States is a follows:

In a composite implement, a body comprising a handle formed of a plurality of flat metal strips, a plurality of tools secured at each end of said body, one tool at one end of said body being partially comprised of curved portions of a pair of said metal strips, said curved portions projecting laterally to either side of said body, the plurality of tools at the opposite end of said body being pivoted to said body and adapted to be positioned between said metal strips when they are in inoperative position, a spring finger located between a pair of said metal strips for each of said pivoted tools, said spring fingers acting to hold said tools either in operative or in inoperative position, a shaft projecting transversely of the body and extending through said strips, a plurality of cams fixed to said shaft for acting on the spring fingers to render the release thereof more facile, a member fixed to one end of said shaft adapted to be manually operated to cause the cams to act on said spring fingers, and squared portions of said pivoted tools for coöperation with said spring fingers.

In testimony whereof I have affixed my signature.

ANDY FTYKLO.